United States Patent
Chiffey et al.

(10) Patent No.: US 11,103,858 B2
(45) Date of Patent: Aug. 31, 2021

(54) PASSIVE NOX ADSORBER

(71) Applicant: Johnson Matthey Public Limited Company, London (GB)

(72) Inventors: Andrew Francis Chiffey, Royston (GB); Jack Corps, Royston (GB); Laura Mitchell-Downie, Royston (GB); Francois Moreau, Royston (GB); Matthew O'Brien, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 16/273,371

(22) Filed: Feb. 12, 2019

(65) Prior Publication Data

US 2019/0168200 A1    Jun. 6, 2019

Related U.S. Application Data

(63) Continuation of application No. 15/285,537, filed on Oct. 5, 2016, now Pat. No. 10,213,775.

(30) Foreign Application Priority Data

Oct. 6, 2015 (GB) ..................... 1517579

(51) Int. Cl.
*B01J 29/78* (2006.01)
*B01D 53/94* (2006.01)
(Continued)

(52) U.S. Cl.
CPC ...... *B01J 29/7815* (2013.01); *B01D 53/9422* (2013.01); *B01D 53/9481* (2013.01); *B01J 21/04* (2013.01); *B01J 21/12* (2013.01); *B01J 23/44* (2013.01); *B01J 23/63* (2013.01); *B01J 23/6562* (2013.01); *B01J 29/74* (2013.01); *B01J 29/743* (2013.01); *B01J 35/0006* (2013.01); *B01J 35/02* (2013.01); *F01N 3/0814* (2013.01); *F01N 3/0842* (2013.01); *F01N 13/009* (2014.06); *B01D 2255/1021* (2013.01);

(Continued)

(58) Field of Classification Search
CPC ..................................... B01J 29/7815
See application file for complete search history.

(56) References Cited

U.S. PATENT DOCUMENTS

| 2012/0201731 | A1* | 8/2012 | Ballinger | ............ B01D 53/9418 |
| | | | | 423/213.2 |
| 2016/0067690 | A1* | 3/2016 | Sato | ....................... B01D 53/94 |
| | | | | 502/73 |

FOREIGN PATENT DOCUMENTS

| RU | 2524165 C2 | | 7/2014 | |
| WO | 2010094313 A1 | | 8/2010 | |
| WO | WO 2014/192219 | * | 4/2014 | ............... B01J 29/74 |

OTHER PUBLICATIONS

Protecting Your Trademark, accessed online on Feb. 8, 2021 (Year: 2021).*
SCRF, accessed online on Feb. 5, 2021. (Year: 2021).*

* cited by examiner

*Primary Examiner* — Daniel C. McCracken

(57) ABSTRACT

A $NO_x$ absorber catalyst for treating an exhaust gas from a lean burn engine. The $NO_x$ absorber catalyst comprises a molecular sieve catalyst comprising a noble metal and a molecular sieve, wherein the molecular sieve contains the noble metal; an oxygen storage material for protecting the molecular sieve catalyst; and a substrate having an inlet end and an outlet end.

11 Claims, 1 Drawing Sheet

(51) Int. Cl.
  *F01N 3/08*   (2006.01)
  *F01N 13/00*   (2010.01)
  *B01J 21/04*   (2006.01)
  *B01J 21/12*   (2006.01)
  *B01J 23/44*   (2006.01)
  *B01J 23/63*   (2006.01)
  *B01J 23/656*   (2006.01)
  *B01J 29/74*   (2006.01)
  *B01J 35/00*   (2006.01)
  *B01J 35/02*   (2006.01)

(52) U.S. Cl.
  CPC ............... *B01D 2255/1023* (2013.01); *B01D 2255/2063* (2013.01); *B01D 2255/2065* (2013.01); *B01D 2255/2066* (2013.01); *B01D 2255/2073* (2013.01); *B01D 2255/2092* (2013.01); *B01D 2255/2096* (2013.01); *B01D 2255/20715* (2013.01); *B01D 2255/40* (2013.01); *B01D 2255/50* (2013.01); *B01D 2255/502* (2013.01); *B01D 2255/908* (2013.01); *B01D 2255/9022* (2013.01); *B01D 2255/9035* (2013.01); *B01D 2255/91* (2013.01); *B01D 2255/915* (2013.01); *F01N 2370/04* (2013.01); *F01N 2510/063* (2013.01); *F01N 2570/14* (2013.01); *F01N 2570/16* (2013.01); *Y02A 50/20* (2018.01)

PASSIVE NOX ADSORBER

CROSS-REFERENCE TO RELATED APPLICATIONS

This application claims priority benefit of GB Patent Application No. 1517579.7, filed Oct. 6, 2015, the disclosure of which is incorporated herein by reference in its entireties for all purposes.

FIELD OF THE INVENTION

The invention relates to a $NO_x$ absorber catalyst for a lean burn engine and to an exhaust system for a lean burn engine comprising the $NO_x$ absorber catalyst. The invention also relates to a method of using the $NO_x$ absorber catalyst to treat an exhaust gas from a lean burn engine.

BACKGROUND TO THE INVENTION

Lean burn engines, such as diesel engines, produce an exhaust emission that generally contains at least four classes of pollutant that are legislated against by inter-governmental organisations throughout the world: carbon monoxide (CO), unburned hydrocarbons (HCs), oxides of nitrogen ($NO_x$) and particulate matter (PM).

A variety of emissions control devices exist for the treatment of oxides of nitrogen ($NO_x$). These devices include, for example, a selective catalytic reduction (SCR) catalyst, a selective catalytic reduction filter (SCRF™) catalyst, a lean $NO_x$ catalyst [e.g. hydrocarbon (HC) SCR catalyst], a lean $NO_x$ trap (LNT) [also known as a $NO_x$ storage catalyst (NSC) or a $NO_x$ adsorber catalyst (NAC)] and a passive $NO_x$ adsorber (PNA).

SCR catalysts or SCRF™ catalysts typically achieve high efficiencies for treating $NO_x$ by reduction once they have reached their effective operating temperature. However, these catalysts or devices can be relatively inefficient below their effective operating temperature, such as when the engine has been started from cold (the "cold start" period) or has been idling for a prolonged period.

Another common type of emissions control device for reducing or preventing the emission of $NO_x$ is a lean $NO_x$ trap (LNT). During normal operation, a lean burn engine produces an exhaust emission having a "lean" composition. An LNT is able to store or trap the nitrogen oxides ($NO_x$) that are present in the "lean" exhaust emission. The LNT stores or traps the $NO_x$ present in the exhaust emission by a chemical reaction between the $NO_x$ and a $NO_x$ storage component of the LNT to form an inorganic nitrate. The amount of $NO_x$ that can be stored by the LNT is limited by the amount of $NO_x$ storage component that is present. Eventually, it will be necessary to release the stored $NO_x$ from the $NO_x$ storage component of the LNT, ideally when a downstream SCR or SCRF™ catalyst has reached its effective operating temperature. Release of stored $NO_x$ from an LNT is typically achieved by running the lean burn engine under rich conditions to produce an exhaust emission having a "rich" composition. Under these conditions, the inorganic nitrates of the $NO_x$ storage component decompose to reform $NO_x$. This requirement to purge an LNT under rich conditions is a disadvantage of this type of emissions control device because it affects the fuel economy of the vehicle and it increases the amount of carbon dioxide ($CO_2$) by combustion of additional fuel. LNTs also tend to show poor $NO_x$ storage efficiency at low temperatures.

A relatively new type of emissions control device for $NO_x$ is a passive $NO_x$ adsorber (PNA). PNAs are able to store or adsorb $NO_x$ at relatively low exhaust gas temperatures (e.g. less than 200° C.), usually by adsorption, and release $NO_x$ at higher temperatures. The $NO_x$ storage and release mechanism of PNAs is thermally controlled, unlike that of LNTs which require a rich purge to release stored $NO_x$.

SUMMARY OF THE INVENTION

The invention relates to a passive $NO_x$ adsorber (PNA) comprising a molecular sieve catalyst. It has been found that this type of PNA is able to store $NO_x$ at a low temperature, typically at a temperature that is much lower than the $NO_x$ storage temperature of a LNT. Such low temperature $NO_x$ storage is advantageous when a lean burn engine has been started from cold (the "cold start" period) or has been idling for a prolonged period.

It has been discovered that the $NO_x$ storage activity of a PNA comprising a molecular sieve catalyst can be destroyed when the PNA is exposed to a rich exhaust gas composition. The invention is based on the recognition of this problem and provides a solution thereto.

A rich exhaust gas composition may be momentarily produced when a lean burn engine is subjected harsh acceleration conditions. The repeated exposure of the PNA to an exhaust gas composition produced in this way may result in the severe degradation or destruction of its $NO_x$ storage activity.

Additionally or alternatively, a PNA comprising a molecular sieve catalyst may be used in conjunction with a LNT. For example, the $NO_x$ release temperature of the PNA may be below the effective operating temperature of a downstream SCR or SCRF™ catalyst. However, the $NO_x$ release temperature of the PNA may overlap with a $NO_x$ storage temperature of a LNT. The PNA may be used in conjunction with a LNT and a SCR or SCRF™ catalyst (e.g. an exhaust system comprising a PNA+LNT+SCR or SCRF™, in that order) to provide a broad temperature window for the storage and treatment of $NO_x$. The rich purge that is used to bring about the release of $NO_x$ from the LNT may destroy the $NO_x$ storage activity of the PNA.

The invention provides a $NO_x$ absorber catalyst for treating an exhaust gas from a lean burn engine, such as a diesel engine. The $NO_x$ absorber catalyst comprises:

a molecular sieve catalyst comprising a noble metal and a molecular sieve, wherein the molecular sieve contains the noble metal;
  an oxygen storage material; and
  a substrate having an inlet end and an outlet end.

The inventors have surprisingly found that an oxygen storage material can be used to reduce or prevent the molecular sieve catalyst from becoming deactivated (i.e. deactivated to $NO_x$ storage), particularly when the molecular sieve catalyst is exposed to rich exhaust gas conditions. Such rich exhaust gas conditions may be produced when a lean burn engine performs combustion at an air-fuel equivalence ratio (known as lambda "λ") less than 1.0.

The invention further provides an exhaust system for a lean burn engine, such as a diesel engine. The exhaust system comprises a $NO_x$ absorber catalyst of the invention and an emissions control device.

A further aspect of the invention relates to a vehicle. The vehicle comprises a lean burn engine and either the $NO_x$ absorber catalyst or the exhaust system of the invention.

The invention also relates to a method of treating an exhaust gas from a lean burn engine. The method comprises either contacting the exhaust gas with a $NO_x$ absorber catalyst of the invention or passing the exhaust gas through an exhaust system of the invention.

The invention further relates to the use of an oxygen storage material to protect a molecular sieve catalyst from deactivation, such as when the molecular sieve catalyst is exposed to an exhaust gas.

BRIEF DESCRIPTION OF THE DRAWINGS

FIGS. 1 to 5 are schematic representations of $NO_x$ absorber catalysts of the invention. In each of the Figures, the left hand side represents an inlet end of the substrate and the right hand side represents an outlet end of the substrate.

DETAILED DESCRIPTION OF THE INVENTION

The $NO_x$ absorber catalyst of the invention is for use as a passive $NO_x$ absorber (PNA). The $NO_x$ absorber catalyst comprises, or may consist essentially of, a molecular sieve catalyst comprising a noble metal and a molecular sieve, wherein the molecular sieve contains the noble metal; an oxygen storage material; and a substrate having an inlet end and an outlet end.

The molecular sieve catalyst comprises a noble metal and a molecular sieve. The molecular sieve catalyst is a passive $NO_x$ absorber (PNA) catalyst (i.e. it has PNA activity). The molecular sieve catalyst can be prepared according to the method described in WO 2012/166868.

The noble metal is typically selected from the group consisting of palladium (Pd), platinum (Pt), rhodium (Rh), gold (Au), silver (Ag), iridium (Ir), ruthenium (Ru) and mixtures of two or more thereof. Preferably, the noble metal is selected from the group consisting of palladium (Pd), platinum (Pt) and rhodium (Rh). More preferably, the noble metal is selected from palladium (Pd), platinum (Pt) and a mixture thereof.

Generally, it is preferred that the noble metal comprises, or consists of, palladium (Pd) and optionally a second metal selected from the group consisting of platinum (Pt), rhodium (Rh), gold (Au), silver (Ag), iridium (Ir) and ruthenium (Ru). Preferably, the noble metal comprises, or consists of, palladium (Pd) and optionally a second metal selected from the group consisting of platinum (Pt) and rhodium (Rh). Even more preferably, the noble metal comprises, or consists of, palladium (Pd) and optionally platinum (Pt). More preferably, the molecular sieve catalyst comprises palladium as the only noble metal.

When the noble metal comprises, or consists of, palladium (Pd) and a second metal, then the ratio by mass of palladium (Pd) to the second metal is >1:1. More preferably, the ratio by mass of palladium (Pd) to the second metal is >1:1 and the molar ratio of palladium (Pd) to the second metal is >1:1.

The molecular sieve catalyst may further comprise a base metal. Thus, the molecular sieve catalyst may comprise, or consist essentially of, a noble metal, a molecular sieve and optionally a base metal. The molecular sieve contains the noble metal and optionally the base metal.

The base metal may be selected from the group consisting of iron (Fe), copper (Cu), manganese (Mn), chromium (Cr), cobalt (Co), nickel (Ni), zinc (Zn) and tin (Sn), as well as mixtures of two or more thereof. It is preferred that the base metal is selected from the group consisting of iron, copper and cobalt, more preferably iron and copper. Even more preferably, the base metal is iron.

Alternatively, the molecular sieve catalyst may be substantially free of a base metal, such as a base metal selected from the group consisting of iron (Fe), copper (Cu), manganese (Mn), chromium (Cr), cobalt (Co), nickel (Ni), zinc (Zn) and tin (Sn), as well as mixtures of two or more thereof. Thus, the molecular sieve catalyst may not comprise a base metal.

In general, it is preferred that the molecular sieve catalyst does not comprise a base metal.

It may be preferable that the molecular sieve catalyst is substantially free of barium (Ba), more preferably the molecular sieve catalyst is substantially free of an alkaline earth metal. Thus, the molecular sieve catalyst may not comprise barium, preferably the molecular sieve catalyst does not comprise an alkaline earth metal.

The molecular sieve is typically composed of aluminium, silicon, and/or phosphorus. The molecular sieve generally has a three-dimensional arrangement (e.g. framework) of $SiO_4$, $AlO_4$, and/or $PO_4$ that are joined by the sharing of oxygen atoms. The molecular sieve may have an anionic framework. The charge of the anionic framework may be counterbalanced by cations, such as by cations of alkali and/or alkaline earth elements (e.g., Na, K, Mg, Ca, Sr, and Ba), ammonium cations and/or protons.

Typically, the molecular sieve has an aluminosilicate framework, an aluminophosphate framework or a silico-aluminophosphate framework. The molecular sieve may have an aluminosilicate framework or an aluminophosphate framework. It is preferred that the molecular sieve has an aluminosilicate framework or a silico-aluminophosphate framework. More preferably, the molecular sieve has an aluminosilicate framework.

When the molecular sieve has an aluminosilicate framework, then the molecular sieve is preferably a zeolite.

The molecular sieve contains the noble metal. The noble metal is typically supported on the molecular sieve. For example, the noble metal may be loaded onto and supported on the molecular sieve, such as by ion-exchange. Thus, the molecular sieve catalyst may comprise, or consist essentially of, a noble metal and a molecular sieve, wherein the molecular sieve contains the noble metal and wherein the noble metal is loaded onto and/or supported on the molecular sieve by ion exchange.

In general, the molecular sieve may be a metal-substituted molecular sieve (e.g. metal-substituted molecular sieve having an aluminosilicate or an aluminophosphate framework). The metal of the metal-substituted molecular sieve may be the noble metal (e.g. the molecular sieve is a noble metal substituted molecular sieve). Thus, the molecular sieve containing the noble metal may be a noble metal substituted molecular sieve. When the molecular sieve catalyst comprises a base metal, then the molecular sieve may be a noble and base metal-substituted molecular sieve. For the avoidance of doubt, the term "metal-substituted" embraces the term "ion-exchanged".

The molecular sieve catalyst generally has at least 1% by weight (i.e. of the amount of noble metal of the molecular sieve catalyst) of the noble metal located inside pores of the molecular sieve, preferably at least 5% by weight, more preferably at least 10% by weight, such as at least 25% by weight, even more preferably at least 50% by weight.

The molecular sieve may be selected from a small pore molecular sieve (i.e. a molecular sieve having a maximum ring size of eight tetrahedral atoms), a medium pore molecular sieve (i.e. a molecular sieve having a maximum ring size of ten tetrahedral atoms) and a large pore molecular sieve (i.e. a molecular sieve having a maximum ring size of twelve tetrahedral atoms). More preferably, the molecular sieve is selected from a small pore molecular sieve and a medium pore molecular sieve.

In a first molecular sieve catalyst embodiment, the molecular sieve is a small pore molecular sieve. The small pore molecular sieve preferably has a Framework Type selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG and ZON, as well as a mixture or intergrowth of any two or more thereof. The intergrowth is preferably selected from KFI-SIV, ITE-RTH, AEW-UEI, AEI-CHA, and AEI-SAV. More preferably, the small pore molecular sieve has a Framework Type that is AEI, CHA or an AEI-CHA intergrowth. Even more preferably, the small pore molecular sieve has a Framework Type that is AEI or CHA, particularly AEI.

Preferably, the small pore molecular sieve has an aluminosilicate framework or a silico-aluminophosphate framework. More preferably, the small pore molecular sieve has an aluminosilicate framework (i.e. the molecular sieve is a zeolite), especially when the small pore molecular sieve has a Framework Type that is AEI, CHA or an AEI-CHA intergrowth, particularly AEI or CHA.

In a second molecular sieve catalyst embodiment, the molecular sieve has a Framework Type selected from the group consisting of AEI, MFI, EMT, ERI, MOR, FER, BEA, FAU, CHA, LEV, MWW, CON and EUO, as well as mixtures of any two or more thereof.

In a third molecular sieve catalyst embodiment, the molecular sieve is a medium pore molecular sieve. The medium pore molecular sieve preferably has a Framework Type selected from the group consisting of MFI, FER, MWW and EUO, more preferably MFI.

In a fourth molecular sieve catalyst embodiment, the molecular sieve is a large pore molecular sieve. The large pore molecular sieve preferably has a Framework Type selected from the group consisting of CON, BEA, FAU, MOR and EMT, more preferably BEA.

In each of the first to fourth molecular sieve catalyst embodiments, the molecular sieve preferably has an aluminosilicate framework (e.g. the molecular sieve is a zeolite).

Each of the aforementioned three-letter codes represents a framework type in accordance with the "IUPAC Commission on Zeolite Nomenclature" and/or the "Structure Commission of the International Zeolite Association".

In any one of the first to fourth molecular sieve catalyst embodiments, it may generally be preferred that the molecular sieve (e.g. large pore, medium pore or small pore) has a framework that is not an intergrowth of at least two different Framework Types.

The molecular sieve typically has a silica to alumina molar ratio (SAR) of 10 to 200 (e.g. 10 to 40), such as 10 to 100, more preferably 15 to 80 (e.g. 15 to 30). The SAR generally relates to a molecular having an aluminosilicate framework (e.g. a zeolite) or a silico-aluminophosphate framework, preferably an aluminosilicate framework (e.g. a zeolite).

The molecular sieve catalyst of the first, third and fourth molecular sieve catalyst embodiments (and also for some of the Framework Types of the second molecular sieve catalyst embodiment), particularly when the molecular sieve is a zeolite, may have an infrared spectrum having a characteristic absorption peak in a range of from 750 $cm^{-1}$ to 1050 $cm^{-1}$ (in addition to the absorption peaks for the molecular sieve itself). Preferably, the characteristic absorption peak is in the range of from 800 $cm^{-1}$ to 1000 $cm^{-1}$, more preferably in the range of from 850 $cm^{-1}$ to 975 $cm^{-1}$.

The molecular sieve catalyst of the first molecular sieve catalyst embodiment has been found to have advantageous passive $NO_x$ adsorber (PNA) activity. The molecular sieve catalyst can be used to store $NO_x$ when exhaust gas temperatures are relatively cool, such as shortly after start-up of a lean burn engine. $NO_x$ storage by the molecular sieve catalyst occurs at low temperatures (e.g. less than 200° C.). As the lean burn engine warms up, the exhaust gas temperature increases and the temperature of the molecular sieve catalyst will also increase. The molecular sieve catalyst will release adsorbed $NO_x$ at these higher temperatures (e.g. 200° C. or above).

It has also been unexpectedly found that the molecular sieve catalyst, particularly the molecular sieve catalyst of the second molecular sieve catalyst embodiment has cold start catalyst activity. Such activity can reduce emissions during the cold start period by adsorbing $NO_x$ and hydrocarbons (HCs) at relatively low exhaust gas temperatures (e.g. less than 200° C.). Adsorbed $NO_x$ and/or HCs can be released when the temperature of the molecular sieve catalyst is close to or above the effective temperature of the other catalyst components or emissions control devices for oxidising NO and/or HCs.

The $NO_x$ absorber catalyst of the invention comprises an oxygen storage material. The oxygen storage material is suitable for protecting the molecular sieve catalyst, particularly from becoming deactivated to $NO_x$ storage. The oxygen storage material is suitable for protecting the molecular sieve catalyst from an exhaust gas having a rich composition. Oxygen storage materials have the ability to store and release oxygen under oxidising and reducing conditions. Without being bound by theory, it is believed that under rich exhaust gas conditions excess pollutant can be oxidised using oxygen provided by the oxygen storage material. The resulting gas composition is less rich and consequently less deactivating for the molecular sieve catalyst.

Typically, the oxygen storage material comprises, or consists essentially of, an oxide of cerium and/or a manganese compound, which manganese compound comprises, or consists of, an oxide of manganese or manganese aluminate. The oxide of cerium is preferably ceria ($CeO_2$). The oxide of manganese may be selected from the group consisting of manganese (II) oxide (MnO), manganese (III) oxide ($Mn_2O_3$), manganese (II, III) oxide ($MnO.Mn_2O_3$[sometimes written as $Mn_3O_4$]) and manganese (IV) oxide ($MnO_2$). Manganese aluminate is $MnAl_2O_4$.

The oxygen storage material may further comprise a second oxide. The term "second" in this context is a label to distinguish the oxide from the oxide of cerium or the oxide of manganese that may be present. The term "second oxide" does not require the presence of a "first oxide".

The second oxide may be selected from the group consisting of zirconia, alumina, lanthanum and a combination of two or more thereof. It may be preferable that the second oxide is zirconia or a combination of zirconia and alumina, particularly when the oxygen storage material comprises an oxide of cerium.

When the oxygen storage material comprises (i) an oxide of cerium and/or a manganese compound and (ii) a second oxide, then the oxygen storage material may comprise a mixed or composite oxide of (i) and (ii), particularly when (i) is an oxide of cerium.

Typically, the mixed or composite oxide consists essentially of:
(a) 20 to 95% by weight of the oxide of cerium and/or the manganese compound, preferably the oxide of cerium (e.g. $CeO_2$), and
(b) 5 to 80% by weight of the second oxide.

It is preferred that the mixed or composite oxide consists essentially of (a) 50 to 95% by weight of the oxide of cerium and/or the manganese compound, preferably the oxide of cerium (e.g. $CeO_2$), and (b) 5 to 50% by weight of the second oxide), more preferably (a) 35 to 80% by weight of the oxide of cerium and/or the manganese compound and (b) 20 to 65% by weight of the second oxide [e.g. (a) 55 to 80% by weight the oxide of cerium and/or the manganese compound and (b) 20 to 45% by weight of the second oxide], even more preferably (a) 45 to 75% by weight of the oxide of cerium and/or the manganese compound and (b) 25 to 55% by weight of the second oxide.

In general, it is preferred that the oxygen storage material comprises, or consists essentially of, an oxide of cerium, particularly ceria.

The oxide of cerium (e.g. $CeO_2$), the manganese compound or the mixed or composite oxide may be doped with a dopant. The total amount of dopant is typically 0.25 to 25% by weight (e.g. 0.25 to 5% by weight) [i.e. of the oxide of cerium (e.g. $CeO_2$), the manganese compound or the mixed or composite oxide], preferably 0.5 to 20% by weight (e.g. 0.5 to 3% by weight or 5 to 20% by weight), more preferably 1 to 15% by weight (e.g. about 1% by weight). The inclusion of a dopant can impart thermal stability.

The dopant may be an element or an oxide thereof, wherein the element is selected from the group consisting of zirconium (Zr), tungsten (W), silicon (Si), titanium (Ti), lanthanum (La), praseodymium (Pr), hafnium (Hf), yttrium (Y), ytterbium (Yb), neodymium (Nd) and a combination of two or more thereof. The element may be selected from the group consisting of tungsten (W), silicon (Si), titanium (Ti), lanthanum (La), praseodymium (Pr), hafnium (Hf), yttrium (Y), ytterbium (Yb), neodymium (Nd) and a combination of two or more thereof.

More preferably, the element is selected from the group consisting of zirconium (Zr), lanthanum (La), praseodymium (Pr), hafnium (Hf), yttrium (Y), ytterbium (Yb), neodymium (Nd) and a combination of two or more thereof. Even more preferably, the element is selected from the group consisting of zirconium (Zr), lanthanum (La), praseodymium (Pr) and a combination of two or more thereof, such as praseodymium (Pr) or a combination of lanthanum (La) and zirconium (Zr).

It may be preferable that the oxide of cerium (e.g. $CeO_2$), the manganese compound or the mixed or composite oxide is not doped with a dopant.

In general, it is preferred that the oxygen storage material comprises, or consists essentially of, an oxide of cerium, particularly ceria (i.e. ceria which is not a mixed or composite oxide).

Typically, the oxygen storage material comprises, or consists essentially of, platinum and/or palladium supported on the oxide of cerium and/or the manganese compound, particularly the oxide of cerium. The platinum and/or palladium is preferably directly supported on the oxide of cerium (i.e. the platinum and/or palladium is in direct contact with a surface of the oxide of cerium) and/or the manganese compound. When platinum and/or palladium is supported on the oxide of cerium and/or the manganese compound, the activity of the oxygen storage material, particularly the oxygen storage activity, may be enhanced and the oxygen storage material may provide greater protection to the molecular sieve catalyst.

Preferably, the oxygen storage material comprises, or consists essentially of, palladium and optionally platinum supported on the oxide of cerium and/or the manganese compound, particularly the oxide of cerium. It is particularly preferred that the platinum and optionally palladium is supported on ceria (i.e. ceria which is not a mixed or composite oxide).

When the oxygen storage material comprises platinum and palladium, then preferably the ratio by mass of platinum to palladium is 10:1 to 1:10, more preferably 8:1 to 1:8, even more preferably 5:1 to 1:5.

The $NO_x$ absorber catalyst of the invention may have one of several arrangements that facilitate the protection of the molecular sieve catalyst by the oxygen storage material.

In a first arrangement, the $NO_x$ absorber catalyst comprises, or consists essentially of, a mixture of the molecular sieve catalyst and the oxygen storage material. The $NO_x$ absorber catalyst may comprise, or consist essentially of, a region comprising, or consisting essentially of, the molecular sieve catalyst and the oxygen storage material (i.e. the molecular sieve catalyst and the oxygen storage material are present in the same region).

Figure 1:
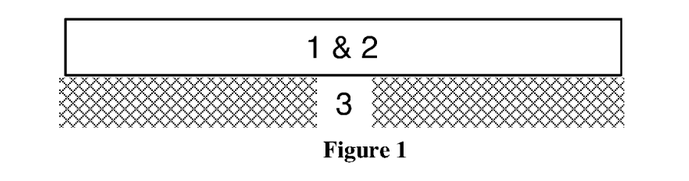
FIG. 1 shows a $NO_x$ absorber catalyst having the oxygen storage material (1) and the molecular sieve catalyst (2) in a single region, which is disposed on a substrate (3).

An example of a first arrangement of the $NO_x$ absorber catalyst is illustrated in FIG. 1.

The region may be disposed or supported on the substrate. It is preferred that the region is directly disposed or directly supported on the substrate (i.e. the region is in direct contact with a surface of the substrate).

In the first arrangement, the region may be a zone. The zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

Alternatively, the region may be a layer. The layer may extend for an entire length (i.e. substantially an entire length) of the substrate, particularly the entire length of the channels of a substrate monolith.

It is preferred in the first arrangement that the oxygen storage material comprises, or consists essentially of, platinum and/or palladium supported on an oxide of cerium and/or the manganese compound, particularly the oxide of cerium. More preferably, the oxygen storage material comprises, or consists essentially, of palladium supported on an oxide of cerium.

In the first arrangement, the region is preferably substantially free of rhodium and/or a $NO_x$ storage component comprising, or consisting essentially of, an oxide, a carbonate or a hydroxide of an alkali metal, an alkaline earth metal and/or a rare earth metal (except for an oxide of cerium (i.e. from the oxygen storage material)).

When the oxygen storage material is mixed with the molecular sieve catalyst, it is able to protect the molecular sieve catalyst from becoming deactivated on exposure to a rich exhaust gas composition.

In a second arrangement, the $NO_x$ absorber catalyst comprises a first region disposed upstream of a second region. The first region comprises, or consists essentially of, the oxygen storage material. The second region comprises, or consists essentially of, the molecular sieve catalyst.

In the second arrangement, the first region and/or the second region may be disposed or supported on the substrate.

Figure 2:
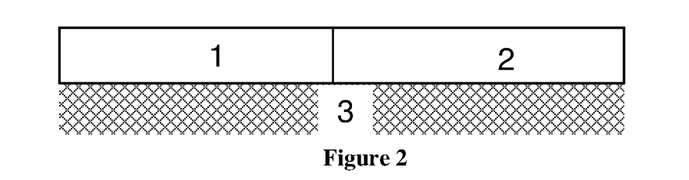
FIG. 2 shows a $NO_x$ absorber catalyst having a first zone comprising the oxygen storage material (1) and a second zone comprising the molecular sieve catalyst (2).
Figure 3:
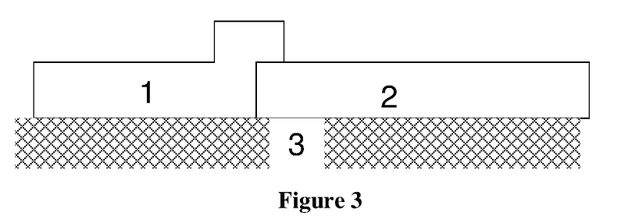
FIG. 3 shows a $NO_x$ absorber catalyst having a first region comprising the oxygen storage material (1) and a second region/zone comprising the molecular sieve catalyst (2). There is an overlap between the first region and the second region/zone. A part of the first region is disposed on the second region/zone. Both the first region and the second region/zone are disposed on the substrate (3).
Figure 4:
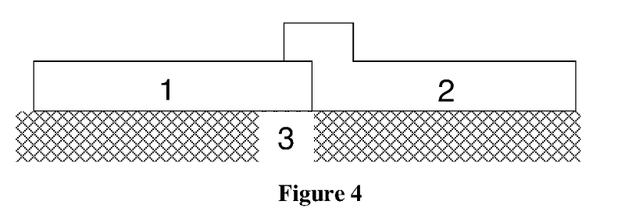
FIG. 4 shows a $NO_x$ absorber catalyst having a first region/zone comprising the oxygen storage material (1) and a second region comprising the molecular sieve catalyst (2). There is an overlap between the first region/zone and the second region. A part of the second region is disposed on the first region/zone. Both the first region/zone and the second region are disposed on the substrate (3).

Examples of the second arrangement of the $NO_x$ absorber catalyst are illustrated in FIGS. 2 to 4.

The second region may be disposed directly on to the substrate (i.e. the second region is in contact with a surface of the substrate). The first region may be:
(a) disposed or supported on the second region; and/or
(b) disposed directly on to the substrate [i.e. the first region is in contact with a surface of the substrate]; and/or
(c) in contact with the second region [i.e. the first region is adjacent to, or abuts, the second region].

The first region may be a first zone and the second region may be a second zone (see the arrangement illustrated in FIG. 2). The first zone may adjoin the second zone. Preferably, the first zone is contact with the second zone.

When the first zone adjoins and/or is in contact with the second zone, then the combination of the first zone and the second zone may be disposed or supported on the substrate as a layer (e.g. a single layer). Thus, a layer (e.g. a single) may be formed on the substrate when the first and second zones adjoin or are in contact with one another. Such an arrangement may avoid problems with back pressure.

A part or portion of the first region may be disposed or supported on the second region (e.g. the first region may overlap the second region). See, for example, the arrangement illustrated in FIG. 3. The second region may be a second zone and the first region may be a first layer or a first zone.

When a part or portion of the first region is disposed or supported on the second region, then preferably the part or portion of the first region is disposed directly on to the second region (i.e. the first region is in contact with a surface of the second region).

Alternatively, a part or portion of the second region may be disposed or supported on the first region (e.g. the second region may overlap the first region). See, for example, the arrangement illustrated in FIG. 4. The first region may be a first zone and the second region may be a second layer or a second zone.

When a part or portion of the second region is disposed or supported on the first region, then preferably the part or portion of the second region is disposed directly on to the first region (i.e. the second region is in contact with a surface of the first region).

Typically, in the $NO_x$ absorber catalyst of the second arrangement, the second region is disposed at an outlet end of the substrate and the first region is disposed upstream of the second region, such as at an inlet end of the substrate.

In the second arrangement, the second region may be a second layer and the first region may be a first zone, wherein the first zone is disposed on the second layer. Preferably the first zone is disposed directly on to the second layer (i.e. the first zone is in contact with a surface of the second layer).

When the first zone is disposed or supported on the second layer, it is preferred that the entire length of the first zone is disposed or supported on the second layer. The length of the first zone is less than the length of the second layer. It is preferred that first zone is disposed on the second layer at an inlet end of the substrate.

Figure 5:
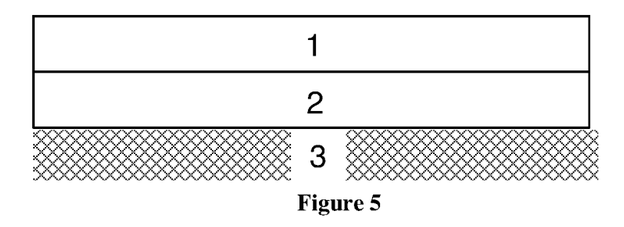
FIG. 5 shows a $NO_x$ absorber catalyst having a first layer comprising the oxygen storage material (1) disposed on a second layer comprising the molecular sieve catalyst (2). The second layer is disposed on the substrate (3).

In a third arrangement, the $NO_x$ absorber catalyst comprises a first layer disposed on a second layer (see, for example, the arrangement illustrated in FIG. 5). Preferably the first layer is disposed directly on to the second layer (i.e. the first layer is in contact with a surface of the second layer).

The second and third arrangements of the $NO_x$ absorber catalyst of the invention are advantageous because the oxygen storage material is arranged to come into contact with all or most of any inlet exhaust gas before the molecular sieve catalyst. When the exhaust gas has a rich composition, these arrangements reduce the likelihood of deactivation of the molecular sieve catalyst.

For the avoidance of doubt, the first region is different (i.e. different composition) to the second region.

In general, with reference to second and third arrangements, when the first region is a first zone, then the first zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

When the second region is a second zone, then generally the second zone has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

In the second and third arrangements, when the first region is a first layer, then typically the first layer extends for an entire length (i.e. substantially an entire length) of the substrate, particularly the entire length of the channels of a substrate monolith.

In general, when the second region is a second layer, then typically the second layer typically extends for an entire length (i.e. substantially an entire length) of the substrate, particularly the entire length of the channels of a substrate monolith.

In the second and third arrangements, the first region is preferably substantially free of rhodium and/or a $NO_x$ storage component comprising, or consisting essentially of, an oxide, a carbonate or a hydroxide of an alkali metal, an alkaline earth metal and/or a rare earth metal (except for an oxide of cerium (i.e. from the oxygen storage material)). More preferably, the first region does not comprise rhodium and/or a $NO_x$ storage component comprising, or consisting essentially of, an oxide, a carbonate or a hydroxide of an alkali metal, an alkaline earth metal and/or a rare earth metal (except for an oxide of cerium (i.e. from the oxygen storage material)). Thus, first region is preferably not a lean $NO_x$ trap (LNT) region (i.e. a region having lean $NO_x$ trap activity).

It may preferable, in the second and third arrangements, that the first region is substantially free of platinum. More preferably, the first region does not comprise platinum.

Additionally or alternatively in the second and third arrangements, the second region is preferably substantially free of rhodium and/or a $NO_x$ storage component comprising, or consisting essentially of, an oxide, a carbonate or a hydroxide of an alkali metal, an alkaline earth metal and/or a rare earth metal (except for an oxide of cerium (i.e. from the oxygen storage material)). More preferably, the second region does not comprise rhodium and/or a $NO_x$ storage component comprising, or consisting essentially of, an oxide, a carbonate or a hydroxide of an alkali metal, an alkaline earth metal and/or a rare earth metal. Thus, second region is preferably not a lean $NO_x$ trap (LNT) region (i.e. a region having lean $NO_x$ trap activity).

Generally, in the second and third arrangements, it may be preferable that the second region is substantially free of an oxide of cerium, such as ceria. Thus, the second region may not comprise an oxide of cerium, such as ceria.

In a fourth arrangement of the invention, the $NO_x$ absorber catalyst has an arrangement as defined in any one of the first to third arrangements described above and further comprises a lean $NO_x$ trap (LNT) region. The lean $NO_x$ trap (LNT) region has lean $NO_x$ trap activity.

The LNT region may be a LNT zone. The LNT zone typically has a length of 10 to 90% (e.g. 10 to 45%) of the length of the substrate, preferably 15 to 75% of the length of the substrate (e.g. 15 to 40%), more preferably 20 to 60% (e.g. 30 to 55% or 25 to 45%) of the length of the substrate, still more preferably 25 to 50% (e.g. 25 to 40%).

Alternatively, the LNT region may be a LNT layer. The LNT layer may extend for an entire length (i.e. substantially an entire length) of the substrate, particularly the entire length of the channels of a substrate monolith.

The LNT region is preferably disposed upstream of the molecular sieve catalyst and the oxygen storage material. It is preferred that the LNT region is disposed at an inlet end of the substrate. More preferably, the LNT region is an LNT zone disposed at an inlet end of the substrate.

The $NO_x$ absorber catalyst of the invention, including any one of the first to fourth arrangements, preferably does not comprise a SCR catalyst (e.g. a region comprising a SCR catalyst), particularly a SCR catalyst comprising a metal selected from the group consisting of cerium (Ce), chromium (Cr), cobalt (Co), copper (Cu), iron (Fe), manganese (Mn), molybdenum (Mo), nickel (Ni), tungsten (W), vanadium (V) or a combination of any two or more thereof.

The regions, zones and layers described hereinabove may be prepared using conventional methods for making and applying washcoats onto a substrate are also known in the art (see, for example, our WO 99/47260, WO 2007/077462 and WO 2011/080525).

The region of the first arrangement and the second region of the second and third arrangements typically comprise a total loading of noble metal (i.e. of the molecular sieve catalyst in the first region) of $\geq 1$ g $ft^{-3}$, preferably $>1$ g $ft^{-3}$, and more preferably $>2$ g $ft^{-3}$.

In general, the region of the first arrangement comprises a total loading of noble metal (e.g. including both the oxygen storage material and the molecular sieve catalyst) of 5 to 550 g $ft^{-3}$, preferably 15 to 400 g $ft^{-3}$ (e.g. 75 to 350 g $ft^{-3}$), more preferably 25 to 300 g $ft^{-3}$. (e.g. 50 to 250 g $ft^{-3}$), still more preferably 30 to 150 g $ft^{-3}$.

For the second and third arrangements, the second region typically comprises a total loading of noble metal (i.e. of the molecular sieve catalyst in the second region) of 1 to 250 g $ft^{-3}$, preferably 5 to 150 g $ft^{-3}$, more preferably 10 to 100 g $ft^{-3}$.

The first region, in the second and third arrangements, typically has a total loading of platinum group metal (e.g. the platinum and/or palladium of the oxygen storage material) of 5 to 300 g $ft^{-3}$. It is preferred that the first region has a total loading of the PGM of 10 to 250 g $ft^{-3}$ (e.g. 75 to 175 g $ft^{-3}$), more preferably 15 to 200 g $ft^{-3}$ (e.g. 50 to 150 g $ft^{-3}$), still more preferably 20 to 150 g $ft^{-3}$.

The region of the first arrangement or the second region of the second and third arrangements may comprise an amount of the oxide of cerium (e.g. the amount of the oxide of cerium of the oxygen storage material) of 0.1 to 4.5 g $in^{-3}$ (e.g. 0.25 to 4.2 g $in^{-3}$), preferably 0.3 to 3.8 g $in^{-3}$, still more preferably 0.5 to 3.0 g $in^{-3}$ (1 to 2.75 g $in^{-3}$ or 0.75 to 1.5 g $in^{-3}$), and even more preferably 0.6 to 2.5 g $in^{-3}$ (e.g. 0.75 to 2.3 g $in^{-3}$).

In the second and third arrangements, the first region may further comprise a hydrocarbon adsorbent material.

The hydrocarbon adsorbent material is typically a zeolite, preferably a zeolite that does not contain a noble metal and/or a base metal. It is preferred that the zeolite is a medium pore zeolite (e.g. a zeolite having a maximum ring size of ten tetrahedral atoms) or a large pore zeolite (e.g. a zeolite having a maximum ring size of twelve tetrahedral atoms). It may be preferable that the zeolite is not a small pore zeolite (e.g. a zeolite having a maximum ring size of eight tetrahedral atoms).

Examples of suitable zeolites or types of zeolite include faujasite, clinoptilolite, mordenite, silicalite, ferrierite, zeolite X, zeolite Y, ultrastable zeolite Y, AEI zeolite, ZSM-5 zeolite, ZSM-12 zeolite, ZSM-20 zeolite, ZSM-34 zeolite, CHA zeolite, SSZ-3 zeolite, SAPO-5 zeolite, offretite, a beta zeolite or a copper CHA zeolite. The zeolite is preferably ZSM-5, a beta zeolite or a Y zeolite.

When the first region comprises a hydrocarbon adsorbent, the total amount of hydrocarbon adsorbent is 0.05 to 3.00 g $in^{-3}$, particularly 0.10 to 2.00 g $in^{-3}$, more particularly 0.2 to 1.0 g $in^{-3}$. For example, the total amount of hydrocarbon adsorbent may be 0.8 to 1.75 g $in^{-3}$, such as 1.0 to 1.5 g $in^{-3}$.

It may generally be preferable that the region of the first arrangement or the first region of the second and third arrangements is substantially free of a hydrocarbon adsorbent material, particularly a zeolite. Thus, the region of the first arrangement or the first region of the second and third arrangements may not comprise a hydrocarbon adsorbent material.

In the second and third arrangements, it may be further preferable that the first region is substantially free of a molecular sieve catalyst, such as the molecular sieve catalyst described herein above. Thus, the first region may not comprise the molecular sieve catalyst.

The $NO_x$ absorber catalyst of the invention comprises a substrate having an inlet end and an outlet end.

The substrate typically has a plurality of channels (e.g. for the exhaust gas to flow through). Generally, the substrate is a ceramic material or a metallic material.

It is preferred that the substrate is made or composed of cordierite ($SiO_2$—$Al_2O_3$—$MgO$), silicon carbide (SiC), Fe—Cr—Al alloy, Ni—Cr—Al alloy, or a stainless steel alloy.

Typically, the substrate is a monolith (also referred to herein as a substrate monolith). Such monoliths are well-known in the art. The substrate monolith may be a flow-through monolith or a filtering monolith.

A flow-through monolith typically comprises a honeycomb monolith (e.g. a metal or ceramic honeycomb monolith) having a plurality of channels extending therethrough, which each channel is open at the inlet end and the outlet end.

A filtering monolith generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure.

When the monolith is a filtering monolith, it is preferred that the filtering monolith is a wall-flow filter. In a wall-flow filter, each inlet channel is alternately separated from an outlet channel by a wall of the porous structure and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

In principle, the substrate may be of any shape or size. However, the shape and size of the substrate is usually selected to optimise exposure of the catalytically active materials in the catalyst to the exhaust gas. The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

The substrate may be an electrically heatable substrate (i.e. the electrically heatable substrate is an electrically heating substrate, in use). When the substrate is an electrically heatable substrate, the $NO_x$ absorber catalyst of the invention comprises an electrical power connection, preferably at least two electrical power connections, more preferably only two electrical power connections. Each electrical power connection may be electrically connected to the electrically heatable substrate and an electrical power source. The $NO_x$ absorber catalyst can be heated by Joule heating, where an electric current through a resistor converts electrical energy into heat energy.

The electrically heatable substrate can be used to release any stored $NO_x$ from the first region. Thus, when the electrically heatable substrate is switched on, the $NO_x$ absorber catalyst will be heated and the temperature of the molecular sieve catalyst can be brought up to its $NO_x$ release temperature. Examples of suitable electrically heatable substrates are described in U.S. Pat. Nos. 4,300,956, 5,146,743 and 6,513,324.

In general, the electrically heatable substrate comprises a metal. The metal may be electrically connected to the electrical power connection or electrical power connections.

Typically, the electrically heatable substrate is an electrically heatable honeycomb substrate. The electrically heatable substrate may be an electrically heating honeycomb substrate, in use.

The electrically heatable substrate may comprise an electrically heatable substrate monolith (e.g. a metal monolith). The monolith may comprise a corrugated metal sheet or foil. The corrugated metal sheet or foil may be rolled, wound or stacked. When the corrugated metal sheet is rolled or wound, then it may be rolled or wound into a coil, a spiral shape or a concentric pattern.

The metal of the electrically heatable substrate, the metal monolith and/or the corrugated metal sheet or foil may comprise an aluminium ferritic steel, such as Fecralloy™.

The invention also provides an exhaust system comprising the $NO_x$ absorber catalyst and an emissions control device. Examples of an emissions control device include a diesel particulate filter (DPF), a lean $NO_x$ trap (LNT), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, an ammonia slip catalyst (ASC) and combinations of two or more thereof. Such emissions control devices are all well known in the art.

It is preferred that the exhaust system comprises an emissions control device selected from the group consisting of a lean $NO_x$ trap (LNT), an ammonia slip catalyst (ASC), diesel particulate filter (DPF), a selective catalytic reduction (SCR) catalyst, a catalysed soot filter (CSF), a selective catalytic reduction filter (SCRF™) catalyst, and combinations of two or more thereof. More preferably, the emissions control device is selected from the group consisting of a lean $NO_x$ trap (LNT), a selective catalytic reduction (SCR) catalyst, a selective catalytic reduction filter (SCRF™) catalyst, and combinations of two or more thereof.

In general, the exhaust system of the invention may further comprise means for introducing hydrocarbon into the exhaust gas.

The means for introducing hydrocarbon into the exhaust gas may comprise, or consist of, a hydrocarbon supply apparatus (e.g. for generating a rich exhaust gas). The hydrocarbon supply apparatus may be electronically coupled to an engine management system, which is configured to inject hydrocarbon into the exhaust gas typically for releasing $NO_x$ (e.g. stored $NO_x$) from a LNT (i.e. as a separate emissions control device or as part of the fourth arrangement of the $NO_x$ absorber catalyst of the invention).

The hydrocarbon supply apparatus may be an injector. The hydrocarbon supply apparatus or injector is suitable for injecting fuel into the exhaust gas. The hydrocarbon supply apparatus is typically disposed downstream of the exhaust outlet of the lean burn engine. The hydrocarbon supply apparatus may be upstream or downstream of the $NO_x$ absorber catalyst of the invention.

Alternatively or in addition to the hydrocarbon supply apparatus, the lean burn engine may comprise an engine management system (e.g. an engine control unit [ECU]). The engine management system may be configured for in-cylinder injection of the hydrocarbon (e.g. fuel) typically for releasing $NO_x$ (e.g. stored $NO_x$) from a LNT (i.e. as a separate emissions control device or as part of the fourth arrangement of the $NO_x$ absorber catalyst of the invention).

Generally, the engine management system is coupled to a sensor in the exhaust system, which monitors the status of a LNT. Such a sensor may be disposed downstream of the LNT. The sensor may monitor the $NO_x$ composition of the exhaust gas at the outlet of the LNT.

In general, the hydrocarbon is fuel, preferably diesel fuel. When the hydrocarbon is fuel, such as diesel fuel, it is preferred that the fuel comprises 50 ppm of sulfur, more preferably ≤15 ppm of sulfur, such as ≤10 ppm of sulfur, and even more preferably ≤5 ppm of sulfur.

In the first to third arrangements of the $NO_x$ absorber catalyst of the invention, the hydrocarbon supply apparatus may be disposed upstream of the $NO_x$ absorber catalyst of the invention.

When the exhaust system of the invention comprises an SCR catalyst or an SCRF™ catalyst, then the exhaust system may further comprise an injector for injecting a nitrogenous reductant, such as ammonia, or an ammonia precursor, such as urea or ammonium formate, preferably urea, into exhaust gas downstream of the oxidation catalyst and upstream of the SCR catalyst or the SCRF™ catalyst. Such an injector may be fluidly linked to a source (e.g. a tank) of a nitrogenous reductant precursor. Valve-controlled dosing of the precursor into the exhaust gas may be regulated by suitably programmed engine management means and closed loop or open loop feedback provided by sensors monitoring the composition of the exhaust gas. Ammonia can also be generated by heating ammonium carbamate (a solid) and the ammonia generated can be injected into the exhaust gas.

Alternatively or in addition to the injector for injecting a nitrogenous reductant, ammonia can be generated in situ (e.g. during rich regeneration of a LNT disposed upstream of the SCR catalyst or the SCRF™ catalyst), such as when the exhaust system further comprises a hydrocarbon supply apparatus, such as an engine management system configured for in-cylinder injection of a hydrocarbon for releasing $NO_x$ (e.g. stored $NO_x$) from a LNT.

The SCR catalyst or the SCRF™ catalyst may comprise a metal selected from the group consisting of at least one of Cu, Hf, La, Au, In, V, lanthanides and Group VIII transition metals (e.g. Fe), wherein the metal is supported on a refractory oxide or molecular sieve.

The metal is preferably selected from Ce, Fe, Cu and combinations of any two or more thereof, more preferably the metal is Fe or Cu.

The refractory oxide for the SCR catalyst or the SCRF™ catalyst may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide (e.g. $V_2O_5/WO_3/TiO_2$, $WO_x/CeZrO_2$, $WO_x/ZrO_2$ or $Fe/WO_x/ZrO_2$).

It is particularly preferred when an SCR catalyst, an SCRF™ catalyst or a washcoat thereof comprises at least one molecular sieve, such as an aluminosilicate zeolite or a SAPO. The at least one molecular sieve can be a small, a medium or a large pore molecular sieve. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts.

Preferred molecular sieves for an SCR catalyst or an SCRF™ catalyst are synthetic aluminosilicate zeolite molecular sieves selected from the group consisting of AEI, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

In a first exhaust system embodiment of the invention, the exhaust system comprises the $NO_x$ absorber catalyst of the invention (including any one of the first to fourth arrangements of the $NO_x$ absorber catalyst) and a lean $NO_x$ trap (LNT) [i.e. an LNT on a separate substrate to the $NO_x$ absorber catalyst]. Such an arrangement may be called a PNA/LNT. The $NO_x$ absorber catalyst is typically followed by (e.g. is upstream of) the lean $NO_x$ trap (LNT). Thus, for example, an outlet of the $NO_x$ absorber catalyst is connected, preferably directly connected (e.g. without an intervening emissions control device), to an inlet of the lean $NO_x$ trap (LNT). There may be a hydrocarbon supply apparatus between the $NO_x$ absorber catalyst and the LNT.

A second exhaust system embodiment relates to an exhaust system comprising the $NO_x$ absorber catalyst of the invention (including any one of the first to fourth arrangements of the $NO_x$ absorber catalyst) and a selective catalytic reduction (SCR) catalyst. Such an arrangement may be called a PNA/SCR. The $NO_x$ absorber catalyst is typically followed by (e.g. is upstream of) the selective catalytic reduction (SCR) catalyst. Thus, for example, an outlet of the $NO_x$ absorber catalyst is connected, preferably directly connected (e.g. without an intervening emissions control device), to an inlet of the SCR catalyst.

A nitrogenous reductant injector may be arranged between the $NO_x$ absorber catalyst and the selective catalytic reduction (SCR) catalyst. Thus, the $NO_x$ absorber catalyst may be followed by (e.g. is upstream of) a nitrogenous reductant injector, and the nitrogenous reductant injector may be followed by (e.g. is upstream of) the selective catalytic reduction (SCR) catalyst.

In the second exhaust system embodiment, it may be preferable that the substrate (e.g. of the $NO_x$ absorber catalyst) is a filtering monolith.

A third exhaust system embodiment comprises the $NO_x$ absorber catalyst of the invention (including any one of the first to fourth arrangements of the $NO_x$ absorber catalyst) and a selective catalytic reduction filter (SCRF™) catalyst. Such an arrangement may be called a PNA/SCRF™. The $NO_x$ absorber catalyst is typically followed by (e.g. is upstream of) the selective catalytic reduction filter (SCRF™) catalyst. Thus, for example, an outlet of the $NO_x$ absorber catalyst is connected, preferably directly connected (e.g. without an intervening emissions control device), to an inlet of the selective catalytic reduction filter (SCRF™) catalyst.

A nitrogenous reductant injector may be arranged between the $NO_x$ absorber catalyst and the selective catalytic reduction filter (SCRF™) catalyst. Thus, the $NO_x$ absorber catalyst may be followed by (e.g. is upstream of) a nitrogenous reductant injector, and the nitrogenous reductant injector may be followed by (e.g. is upstream of) the selective catalytic reduction filter (SCRF™) catalyst.

A fourth exhaust system embodiment relates to an exhaust system comprising the $NO_x$ absorber catalyst of the invention (including any one of the first to fourth arrangements of the $NO_x$ absorber catalyst), a lean $NO_x$ trap (LNT) and either a selective catalytic reduction (SCR) catalyst or selective catalytic reduction filter (SCRF™) catalyst. These arrangements may be called a PNA/LNT/SCR arrangement or a PNA/LNT/SCRF™ arrangement. The $NO_x$ absorber catalyst is typically followed by (e.g. is upstream of) the lean $NO_x$ trap (LNT). The lean $NO_x$ trap (LNT) is typically followed by (e.g. is upstream of) either the selective catalytic reduction (SCR) catalyst or the selective catalytic reduction filter (SCRF™) catalyst. There may be a hydrocarbon supply apparatus between the $NO_x$ absorber catalyst and the LNT.

A nitrogenous reductant injector may be arranged between the lean $NO_x$ trap (LNT) and either the selective catalytic reduction (SCR) catalyst or the selective catalytic reduction filter (SCRF™) catalyst. Thus, the lean $NO_x$ trap (LNT) may be followed by (e.g. is upstream of) a nitrogenous reductant injector, and the nitrogenous reductant injector may be followed by (e.g. is upstream of) the selective catalytic reduction (SCR) catalyst or the selective catalytic reduction filter (SCRF™) catalyst.

A fifth exhaust system embodiment relates to an exhaust system comprising the $NO_x$ absorber catalyst of the invention (including any one of the first to fourth arrangements of the $NO_x$ absorber catalyst), a catalysed soot filter (CSF) and a selective catalytic reduction (SCR) catalyst. Such an arrangement may be called a PNA/CSF/SCR. The $NO_x$ absorber catalyst is typically followed by (e.g. is upstream of) the catalysed soot filter (CSF). The catalysed soot filter is typically followed by (e.g. is upstream of) the selective catalytic reduction (SCR) catalyst.

A nitrogenous reductant injector may be arranged between the catalysed soot filter (CSF) and the selective catalytic reduction (SCR) catalyst. Thus, the catalysed soot filter (CSF) may be followed by (e.g. is upstream of) a nitrogenous reductant injector, and the nitrogenous reductant injector may be followed by (e.g. is upstream of) the selective catalytic reduction (SCR) catalyst.

In each of the second to fifth exhaust system embodiments described hereinabove, an ASC catalyst can be disposed downstream from the SCR catalyst or the SCRF™ catalyst (i.e. as a separate substrate monolith), or more preferably a zone on a downstream or trailing end of the substrate monolith comprising the SCR catalyst can be used as a support for the ASC.

The exhaust system of the invention (including the first to the fifth exhaust system embodiments) may further comprise means for introducing hydrocarbon (e.g. fuel) into the exhaust gas. When the means for introducing hydrocarbon into the exhaust gas is a hydrocarbon supply apparatus, it is generally preferred that the hydrocarbon supply apparatus is downstream of the $NO_x$ absorber catalyst of the invention (unless otherwise specified above).

It may be preferable that the exhaust system of the invention does not comprise a lean $NO_x$ trap (LNT), particularly a lean $NO_x$ trap (LNT) upstream of the $NO_x$ absorber catalyst, such as directly upstream of the $NO_x$ absorber catalyst (e.g. without an intervening emissions control device).

The PNA activity of the $NO_x$ absorber catalyst of the present invention allows $NO_x$, particularly $NO_x$, to be stored at low exhaust temperatures. At higher exhaust gas temperatures, the $NO_x$ absorber catalyst is able to oxidise $NO_x$ to $NO_2$. It is therefore advantageous to combine the $NO_x$ absorber catalyst of the invention with certain types of emissions control devices as part of an exhaust system.

Another aspect of the invention relates to a vehicle or an apparatus. The vehicle or apparatus comprises a lean burn engine. Preferably, the lean burn engine is a diesel engine.

The diesel engine may be a homogeneous charge compression ignition (HCCI) engine, a pre-mixed charge compression ignition (PCCI) engine or a low temperature combustion (LTC) engine. It is preferred that the diesel engine is a conventional (i.e. traditional) diesel engine.

It is preferred that the lean burn engine is configured or adapted to run on fuel, preferably diesel fuel, comprises ≤50 ppm of sulfur, more preferably ≤15 ppm of sulfur, such as ≤10 ppm of sulfur, and even more preferably ≤5 ppm of sulfur.

The vehicle may be a light-duty diesel vehicle (LDV), such as defined in US or European legislation. A light-duty diesel vehicle typically has a weight of <2840 kg, more preferably a weight of <2610 kg.

In the US, a light-duty diesel vehicle (LDV) refers to a diesel vehicle having a gross weight of ≤8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty diesel vehicle (HDV), such as a diesel vehicle having a gross weight of >8,500 pounds (US lbs), as defined in US legislation.

The invention also relates to a method of treating an exhaust gas from a lean burn engine. The method comprises the steps of:

(a) contacting the exhaust gas with a $NO_x$ absorber catalyst of the invention at a first temperature range to store $NO_x$; and (b) releasing $NO_x$ from the $NO_x$ absorber catalyst at a second temperature range; wherein the second temperature range is higher the first temperature range (e.g. the midpoint of the second temperature range is higher than the midpoint of the first temperature range).

It is preferable that the second temperature range does not overlap with the first temperature range. There may be a gap between the upper limit of first temperature range and the lower limit of the second temperature range.

Typically, the $NO_x$ absorber catalyst releases $NO_x$ at a temperature greater than 200° C. This is the lower limit of the second temperature range. Preferably, the $NO_x$ absorber catalyst releases $NO_x$ at a temperature of 220° C. or above, such as 230° C. or above, 240° C. or above, 250° C. or above, or 260° C. or above.

The $NO_x$ absorber catalyst typically absorbs or stores $NO_x$ at a temperature of 250° C. or less. This is the upper limit of the first temperature range. Preferably, the $NO_x$ absorber catalyst absorbs or stores $NO_x$ at a temperature of 220° C. or less, such as 200° C. or less, 190° C. or less, 180° C. or less, or 175° C. or less.

The $NO_x$ absorber catalyst may preferentially absorb or store nitric oxide (NO). Thus, any reference to absorbing, storing or releasing $NO_x$ in this context may refer absorbing, storing or releasing nitric oxide (NO). Preferential absorption or storage of NO will decrease the ratio of $NO:NO_2$ in the exhaust gas.

The invention further relates to the use of an oxygen storage material to protect a molecular sieve catalyst from deactivation, such as when the molecular sieve catalyst is exposed to an exhaust gas, preferably a rich exhaust gas. The term "deactivation" in this context refers to a degradation in $NO_x$ absorption. The rich exhaust gas is typically produced by a lean burn engine when combustion is performed at an air-fuel equivalence ratio (known as lambda "λ") of less than 1.0.

DEFINITIONS

The term "region" as used herein refers to an area of washcoat on a substrate. A "region" can, for example, be disposed or supported on a substrate as a "layer" or a "zone". The area or arrangement of a washcoat on a substrate is generally controlled during the process of applying the washcoat to the substrate. The "region" typically has distinct boundaries or edges (i.e. it is possible to distinguish one region from another region using conventional analytical techniques).

The term "washcoat" is well known in the art and refers to an adherent coating that is applied to a substrate usually during production of a catalyst.

Typically, the "region" has a substantially uniform length. The reference to a "substantially uniform length" in this context refers to a length that does not deviate (e.g. the difference between the maximum and minimum length) by more than 10%, preferably does not deviate by more than 5%, more preferably does not deviate by more than 1%, from its mean value.

It is preferable that each "region" has a substantially uniform composition (i.e. there is no substantial difference in the composition of the washcoat when comparing one part of the region with another part of that region). Substantially uniform composition in this context refers to a material (e.g. region) where the difference in composition when comparing one part of the region with another part of the region is 5% or less, usually 2.5% or less, and most commonly 1% or less.

The term "zone" as used herein refers to a region having a length that is less than the total length of the substrate, such as 75% of the total length of the substrate. A "zone" typically has a length (i.e. a substantially uniform length) of at least 5% (e.g. ≥5%) of the total length of the substrate.

The total length of a substrate is the distance between its inlet end and its outlet end (e.g. the opposing ends of the substrate).

Any reference to a "zone disposed at an inlet end of the substrate" used herein refers to a zone disposed or supported on a substrate where the zone is nearer to an inlet end of the substrate than the zone is to an outlet end of the substrate. Thus, the midpoint of the zone (i.e. at half its length) is nearer to the inlet end of the substrate than the midpoint is to the outlet end of the substrate. Similarly, any reference to a "zone disposed at an outlet end of the substrate" used herein refers to a zone disposed or supported on a substrate where the zone is nearer to an outlet end of the substrate than the zone is to an inlet end of the substrate. Thus, the midpoint of the zone (i.e. at half its length) is nearer to the outlet end of the substrate than the midpoint is to the inlet end of the substrate.

When the substrate is a wall-flow filter, then generally any reference to a "zone disposed at an inlet end of the substrate" refers to a zone disposed or supported on the substrate that is:
(a) nearer to an inlet end (e.g. open end) of an inlet channel of the substrate than the zone is to a closed end (e.g. blocked or plugged end) of the inlet channel, and/or
(b) nearer to a closed end (e.g. blocked or plugged end) of an outlet channel of the substrate than the zone is to an outlet end (e.g. open end) of the outlet channel.

Thus, the midpoint of the zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "zone disposed at an outlet end of the substrate" when the substrate is a wall-flow filter refers to a zone disposed or supported on the substrate that is:
(a) nearer to an outlet end (e.g. an open end) of an outlet channel of the substrate than the zone is to a closed end (e.g. blocked or plugged) of the outlet channel, and/or
(b) nearer to a closed end (e.g. blocked or plugged end) of an inlet channel of the substrate than it is to an inlet end (e.g. an open end) of the inlet channel.

Thus, the midpoint of the zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A zone may satisfy both (a) and (b) when the washcoat is present in the wall of the wall-flow filter (i.e. the zone is in-wall).

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "adsorber" as used herein, particularly in the context of a $NO_x$ adsorber, should not be construed as being limited to the storage or trapping of a chemical entity (e.g. $NO_x$) only by means of adsorption. The term "adsorber" used herein is synonymous with "absorber".

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "consist essentially" as used herein limits the scope of a feature to include the specified materials, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a region, a layer or a zone, means that the material in a minor amount, such as ≤5% by weight, preferably ≤2% by weight, more preferably ≤1% by weight. The expression "substantially free of" embraces the expression "does not comprise".

Any reference to an amount of dopant, particularly a total amount, expressed as a % by weight as used herein refers to the weight of the support material or the refractory metal oxide thereof.

EXAMPLES

The invention will now be illustrated by the following non-limiting examples.

Example 1

Pd nitrate was added to a slurry of a small pore zeolite with CHA structure and was stirred. Alumina binder was added and then the slurry was applied to a cordierite flow through monolith having 400 cells per square inch structure using established coating techniques. The coating was dried and calcined at 500° C. A coating containing a Pd-exchanged zeolite was obtained. The Pd loading of this coating was 80 g ft$^{-3}$.

Example 2

Pd nitrate was added to a slurry of a small pore zeolite with CHA structure and was stirred. Alumina binder was added and then the slurry was applied to a cordierite flow through monolith having 400 cells per square inch structure using established coating techniques. The coating was dried and calcined at 500° C. A coating containing a Pd-exchanged zeolite was obtained. The Pd loading of this coating was 80 g ft$^{-3}$.

A second slurry was prepared using cerium oxide. Appropriate amounts of soluble platinum and palladium salts were added and the slurry was stirred to homogenise. Alumina binder was added and the resulting washcoat was applied as a second layer to the flow through monolith using established coating techniques. The coating was dried and calcined at 500° C. The Pt loading of this coating was 40 g ft$^{-3}$ and the Pd loading was 20 g ft$^{-3}$.

Experimental Results

The catalysts of examples 1 and 2 were each fitted to a 1.6 litre bench mounted diesel engine. The engine was run to perform a simulated World Harmonised Light Duty Test Cycles (WLTC). Emissions were measured pre- and post-catalyst. The NO$_x$ absorbing performance of each catalyst was determined as the difference between the cumulative NO$_x$ emission pre-catalyst compared with the cumulative NO$_x$ emission post-catalyst. The difference between the pre- and post-catalyst cumulative NO$_x$ emissions is attributed to NO$_x$ absorbed by the catalyst. The first tests were run with the catalysts in a fresh condition.

The catalysts of examples 1 and 2 were each then exposed to 30 cycles of lean/rich cycling on the engine. Each cycle comprised 300 seconds lean operation followed by 10 seconds of rich operation at lambda 0.95. The exhaust gas temperature at the catalyst inlet was controlled to 250° C. during the lean operation. The catalysts were then re-assessed for NO$_x$ absorbing performance by running WLTC cycles.

Table 1 below shows the NO$_x$ absorbing performance for the catalysts of examples 1 and 2 at 500 seconds into the WLTC test in the fresh condition and after exposure to lean/cycle cycles.

TABLE 1

| Example No. | NO$_x$ absorbed at 500 seconds (g) | |
|---|---|---|
| | Fresh condition | After lean/rich exposure |
| 1 | 0.38 | 0.27 |
| 2 | 0.39 | 0.37 |

The catalyst of example 1 shows significant reduction in the amount of NO$_x$ absorbed after exposure to lean/rich cycling. In contrast, the catalyst of example 2 (which comprises an oxygen storage material) shows a small reduction in the amount of NO$_x$ absorbed after exposure to lean/rich cycling. The catalyst of example 2 according to the invention is more resistant to exposure to rich exhaust gas conditions.

Example 3

Pd nitrate was added to a slurry of a small pore zeolite with AEI structure and stirred. Alumina binder was added and then the slurry was applied to a cordierite flow through monolith having 400 cells per square inch using established coating techniques. The coating was dried and calcined at 500° C. A coating containing a Pd-exchanged zeolite was obtained. The Pd loading of this coating was 80 g ft$^{-3}$.

A second slurry was prepared using a silica-alumina powder milled to a d$_{90}$<20 micron. Beta zeolite was added followed by bismuth nitrate solution and an appropriate amount of soluble Pt salt such that the slurry comprised 26% zeolite and 74% silica-alumina. The mixture was stirred to homogenise then applied to the inlet end of the flow through monolith using established coating techniques. The coating was dried and calcined at 500° C. The Pt loading of this coating was 68 g ft$^{-3}$.

A third slurry was prepared using a Mn-doped silica-alumina powder milled to a d$_{90}$<20 micron. Soluble platinum salt was added and the mixture was stirred to homogenise. The slurry was applied to the channels at outlet end of the flow through monolith using established coating techniques. The coating was dried and calcined at 500° C. The Pt loading of this coating was 68 g ft$^{-3}$.

Example 4

Pd nitrate was added to a slurry of a small pore zeolite with AEI structure and stirred. Alumina binder was added and then the slurry was applied to a cordierite flow through monolith having 400 cells per square inch using established coating techniques. The coating was dried and calcined at 500° C. A coating containing a Pd-exchanged zeolite was obtained. The Pd loading of this coating was 80 g ft$^{-3}$.

A second slurry was prepared using praseodymium oxide doped ceria (10% by mass of Pr$_6$O$_{11}$). Platinum nitrate solution was added followed by 10% alumina binder by mass. The slurry was stirred to homogenise and applied to the flow through monolith using established coating techniques. The part was dried and calcined at 500° C. The Pt loading of this coating was 50 g ft$^{-3}$.

A third slurry was prepared using a silica-alumina powder milled to a d$_{90}$<20 micron. Beta zeolite was added followed by bismuth nitrate solution and an appropriate amount of soluble Pt salt such that the slurry comprised 33% zeolite and 67% silica-alumina. The mixture was stirred to homogenise then applied to the inlet end of the flow through monolith using established coating techniques. The coating was dried and calcined at 500° C. The Pt loading of this coating was 68 g ft$^{-3}$.

A fourth slurry was prepared using a Mn-doped silica-alumina powder milled to a d$_{90}$<20 micron. Soluble platinum salt was added and the mixture was stirred to homogenise. The slurry was applied to the channels at outlet end of the flow through monolith using established coating techniques. The coating was dried and calcined at 500° C. The Pt loading of this coating was 68 g ft$^{-3}$.

Example 5

Pd nitrate was added to a slurry of a small pore zeolite with AEI structure and stirred. Alumina binder was added and then the slurry was applied to a cordierite flow through monolith having 400 cells per square inch using established coating techniques. The coating was dried and calcined at 500° C. A coating containing a Pd-exchanged zeolite was obtained. The Pd loading of this coating was 80 g ft$^{-3}$.

A second slurry was prepared using a zirconia and lanthana doped ceria (10% by mass of ZrO$_2$ and 5% by mass of La$_2$O$_3$). Platinum nitrate solution was added followed by 10% alumina binder by mass. The slurry was stirred to homogenise and applied to the flow through monolith using established coating techniques. The part was dried and calcined at 500° C. The Pt loading of this coating was 50 g ft$^{-3}$.

A third slurry was prepared using a silica-alumina powder milled to a d$_{90}$<20 micron. Beta zeolite was added followed by bismuth nitrate solution and an appropriate amount of soluble Pt salt such that the slurry comprised 33% zeolite and 67% silica-alumina. The mixture was stirred to homogenise then applied to the inlet end of the flow through monolith using established coating techniques. The coating was dried and calcined at 500° C. The Pt loading of this coating was 68 g ft$^{-3}$.

A forth slurry was prepared using a Mn-doped silica-alumina powder milled to a $d_{90}$<20 micron. Soluble platinum salt was added and the mixture was stirred to homogenise. The slurry was applied to the channels at outlet end of the flow through monolith using established coating techniques. The coating was dried and calcined at 500° C. The Pt loading of this coating was 68 g ft$^{-3}$.

Experimental Results

The catalysts of Examples 3, 4 and 5 were hydrothermally aged at 750° C. for 15 hours with 10% water. They were performance tested over a simulated WLTC emissions cycle using a bench mounted diesel engine. Emissions were measured pre- and post-catalyst. The NO$_x$ adsorbing performance of each catalyst was determined as the difference between the cumulative NO$_x$ emission pre-catalyst compared with the cumulative NO$_x$ emission post-catalyst. The difference between the pre- and post-catalyst cumulative NO$_x$ emissions is attributed to NO$_x$ adsorbed by the catalyst.

Table 2 below shows the hydrothermally aged NO$_x$ adsorbing performance of each catalyst at 1000 seconds into the WLTC test.

TABLE 2

| Example No. | NO$_x$ adsorbed at 1000 seconds (g) |
|---|---|
| 3 | 0.79 |
| 4 | 0.84 |
| 5 | 0.84 |

The results in Table 2 show that the catalysts of Examples 3 to 5 have similar NO$_x$ adsorbing performance after hydrothermal ageing.

The catalysts of Examples 3, 4 and 5 were then exposed to rich exhaust gas from the diesel engine. A treatment cycle comprising 100 seconds of lean exhaust gas exposure at a catalyst inlet temperature of 260° C. was followed by 2 seconds of rich exhaust gas exposure at lambda 0.95 (generated by an ECU demand of 4 seconds rich combustion and allowing for oxygen to be purged from the system). The lean/rich treatment cycle was repeated 200 times giving a total cumulative rich gas exposure of 400 seconds. After rich gas exposure the catalysts of Examples 3, 4 and 5 were performance tested again over the simulated WLTC emissions cycle.

Table 3 below shows the NO$_x$ adsorbing performance of each catalyst after the cumulative 400 seconds of rich exhaust gas exposure.

TABLE 3

| Example No. | NO$_x$ adsorbed at 1000 seconds (g) |
|---|---|
| 3 | 0.59 |
| 4 | 0.79 |
| 5 | 0.79 |

By comparing the results in Table 3 with those in Table 2 it can be seen that after exposure to rich exhaust gas that the catalyst of Example 3 undergoes a greater reduction in NO$_x$ adsorbing performance than the catalysts of Examples 4 and 5. Examples 4 and 5 show only a minor change in NO$_x$ adsorbing performance after exposure to rich exhaust gas. Examples 4 and 5 comprise rare earth oxide doped ceria materials that have oxygen storage capacity.

For the avoidance of any doubt, the entire content of any and all documents cited herein is incorporated by reference into the present application.

The invention claimed is:

1. An exhaust system for a lean burn engine comprising a NO$_x$ absorber catalyst for treating an exhaust gas from the lean burn engine and an emissions control device,
wherein the NO$_x$ absorber catalyst comprises:
a first layer comprising an oxygen storage material effective for protecting the molecular sieve catalyst by preventing the molecular sieve catalyst from becoming deactivated to NO$_x$ storage when exposed to rich exhaust gas conditions;
a second layer comprising a molecular sieve catalyst comprising a noble metal and a molecular sieve, wherein the molecular sieve contains the noble metal, and wherein the noble metal comprises palladium; and
a substrate having an inlet end and an outlet end;
wherein the first layer is disposed on the second layer; and
wherein the emissions control device is a selective catalytic reduction catalyst, a selective catalytic reduction filter catalyst, or their combinations,
wherein the NOx absorber catalyst is upstream of the emissions control device.

2. The exhaust system according to claim 1, wherein the molecular sieve is selected from a small pore molecular sieve, a medium pore molecular sieve and a large pore molecular sieve.

3. The exhaust system according to claim 1, wherein the molecular sieve is a small pore molecular sieve having a Framework Type selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON and a mixture or intergrowth of any two or more thereof.

4. The exhaust system according to claim 3, wherein the small pore molecular sieve has a Framework Type that is AEI or CHA.

5. The exhaust system according to claim 1, wherein the molecular sieve has an aluminosilicate framework and a silica to alumina molar ratio of 10 to 200.

6. The exhaust system according to claim 1, wherein the oxygen storage material for protecting the molecular sieve catalyst comprises at least one of an oxide of cerium or a manganese compound, wherein the manganese compound comprises an oxide of manganese or manganese aluminate.

7. The exhaust system according to claim 1, wherein the oxygen storage material for protecting the molecular sieve catalyst comprises an oxide of cerium, palladium, and optionally platinum, supported on the oxide of cerium.

8. The exhaust system according to claim 1, wherein the substrate is a flow-through monolith or a filtering monolith.

9. The exhaust system according to claim 1, wherein the emissions control device is selected from the group consisting of a lean NOx trap, a selective catalytic reduction catalyst, a selective catalytic reduction filter catalyst, and combinations of two or more thereof.

10. A vehicle comprising a lean burn engine and an exhaust system as defined in claim 1.

11. A method of treating an exhaust gas from a lean burn engine comprising contacting the exhaust gas with a $NO_x$ absorber catalyst and an emissions control device,
wherein the $NO_x$ absorber catalyst comprises:
- a first layer comprising an oxygen storage material effective for protecting the molecular sieve catalyst by preventing the molecular sieve catalyst from becoming deactivated to $NO_x$ storage when exposed to rich exhaust gas conditions;
- a second layer comprising a molecular sieve catalyst comprising a noble metal and a molecular sieve, wherein the molecular sieve contains the noble metal, and wherein the noble metal comprises palladium; and
- a substrate having an inlet end and an outlet end;
wherein the first layer is disposed on the second layer; and wherein the emissions control device is a selective catalytic reduction catalyst, a selective catalytic reduction filter catalyst, or their combinations, wherein the NOx absorber catalyst is upstream of the emissions control device.

\* \* \* \* \*